US006604488B2

(12) United States Patent
Heinzeroth et al.

(10) Patent No.: US 6,604,488 B2
(45) Date of Patent: Aug. 12, 2003

(54) WILDLIFE FEEDER

(75) Inventors: Jerry E. Heinzeroth, Rockford, IL (US); Ronald L. Lundstrom, Rockford, IL (US)

(73) Assignee: Century Tool and Manufacturing Company, Inc., Cherry Valley, IL (US)

( * ) Notice: Subject to any disclaimer, the term of this patent is extended or adjusted under 35 U.S.C. 154(b) by 0 days.

(21) Appl. No.: 10/010,606

(22) Filed: Dec. 10, 2001

(65) Prior Publication Data

US 2003/0106497 A1 Jun. 12, 2003

(51) Int. Cl.$^7$ ................................................ A01K 1/00
(52) U.S. Cl. ..................................... 119/61; 248/225.11
(58) Field of Search ................ 119/61, 62; 248/222.11, 248/222.12, 225.11, 225.2

(56) References Cited

U.S. PATENT DOCUMENTS

| 733,448 A | * | 7/1903 | Williams |
|---|---|---|---|
| 948,794 A | | 2/1910 | Peifer et al. |
| 3,077,863 A | | 2/1963 | Chilovich ..................... 119/62 |
| 3,361,116 A | | 1/1968 | Daniel et al. ................. 119/63 |
| 4,154,356 A | | 5/1979 | Schieve ........................ 220/18 |
| 4,261,294 A | * | 4/1981 | Bescherer .................. 119/57.8 |
| 4,632,061 A | | 12/1986 | Tucker et al. .............. 119/51 R |
| 4,771,735 A | | 9/1988 | Larsen ......................... 119/61 |
| 4,798,170 A | * | 1/1989 | DePiazzy ..................... 119/61 |
| 4,942,845 A | | 7/1990 | Lane .......................... 119/52.2 |
| 5,226,717 A | * | 7/1993 | Hoffman ..................... 211/153 |
| D338,745 S | | 8/1993 | Ervin et al. ................ D30/121 |
| 5,348,268 A | * | 9/1994 | Klein .................... 248/222.11 |
| D359,146 S | | 6/1995 | Finch ......................... D30/121 |
| 5,546,894 A | | 8/1996 | St. Pierre ..................... 119/61 |
| 5,829,382 A | * | 11/1998 | Garrison .................... 119/52.2 |
| 5,870,969 A | | 2/1999 | Boyce .......................... 119/61 |
| 6,209,489 B1 | * | 4/2001 | Akins ........................ 119/52.1 |

* cited by examiner

Primary Examiner—Charles T. Jordan
Assistant Examiner—Kimberly S. Smith
(74) Attorney, Agent, or Firm—Kenneth J. Hovet

(57) ABSTRACT

A wildlife feeder is provided comprising a housing for holding wildlife feed and a separable mounting subassembly for releasable attachment of the housing to a support structure. The housing comprises a base from which extend upstanding walls. The base has a peripheral skirt and an underside with anchor structures for placement of the free ends of a wire form wildlife perch structure. The wire form extends a predetermined distance out from the base outer periphery and is constrained from downward tilt with retention notches in the peripheral skirt. The mounting subassembly comprises a bracket having engagement elements for insertion into slots in the back wall of the housing. The engagement elements include releasable retention tabs so that the housing can easily be removed from the bracket for food resupplying, cleaning and repair. The bracket includes a hinged roof structure. When the housing is attached to the bracket, the roof rotatably encloses the housing open top. The roof and bracket have coordinated abutment structures to prevent the roof from exceeding a maximum angular rotation.

10 Claims, 6 Drawing Sheets

WILDLIFE FEEDER

BACKGROUND OF THE INVENTION

1. Field of the Invention

The present invention pertains to devices for feeding wildlife. More particularly, it concerns a feeder housing and a bracket for mounting the housing to a support structure.

2. Description of Related Art

When operating and maintaining wildlife feeders, it is helpful to be able to remove the feeder from its mounting structure. This is because continuous exposure to an outdoor environment results in the need for frequent maintenance. Also, the feeder should to be cleaned frequently and the supply of food will need to be replenished on a regular basis.

To accomplish each of the above activities, it is most convenient to remove the feeder entirely from its mount. This convenience has been noted in the prior art. For example, U.S. Pat. No. 4,632,061 discloses a bird feeder having removable multiple food bins arranged beneath a roof. Each bin rests up on a center hub and cantilevers outwardly against a roof flange. For removal, the bin is lifted and its bottom is tilted outwardly. In this way, the roof flange is cleared and the bin can be removed.

A problem with the above system is that the bins are not securely held in place. They are not able to withstand rough treatment from an animal or the environment. Moreover, if one bin is dislodged, lateral support for the others becomes weak. This de-stabilizes the assembly making it easier for the remaining bins to become loose and fall away.

U.S. Pat. Nos. 4,992,845 and 5,070,969 are improvements over the above feeder whereby feeders are removable from a secured mounting structure. In both patents, however, the entire feeder assembly is being removed, including the feeder cover. This is an unnecessary and cumbersome procedure. It especially hinders cleaning and repair work for feeders that include means for limiting the degree of rotation of a lid.

Furthermore, the flange and open slot feeder connection disclosed in both of the aforementioned patents have no upward vertical restraint. As such, the entire feeders are vulnerable to unwanted dislodgement—especially in the case of animal feeders. Simply elevating the feeder via an animal's muzzle will result in disengagement of the feeder from the above open-slot mounting structure and spill the feeder's food supply. U.S. Pat. Nos. 3,077,863 and 5,546,894 are illustrative of a feeder's food supply being accessed by the uplifting action of an animal's muzzle.

SUMMARY OF THE INVENTION

The present invention overcomes the aforementioned prior art disadvantages by providing a wildlife feeder having a secure but releasable connection to a stationary support structure. The feeder includes a roof that is combined with the feeder mounting bracket—not the feeder housing. This arrangement enables a user to remove and access the feeder housing independent of the roof. All the prior art constraints relating to repairing, cleaning and refilling the housing with animal food are thereby avoided.

The overall assembly of the invention comprises a food supply housing having a base with upstanding walls defining an open top. The housing is releasably connected to a bracket which is secured to a support structure. A roof, which overlies the open top, is rotatably attached to the bracket. Housing and bracket connector means combine to provide easy disengagement of the housing from the roof/bracket combination.

DESCRIPTION OF THE PREFERRED EMBODIMENTS

Figure 1:
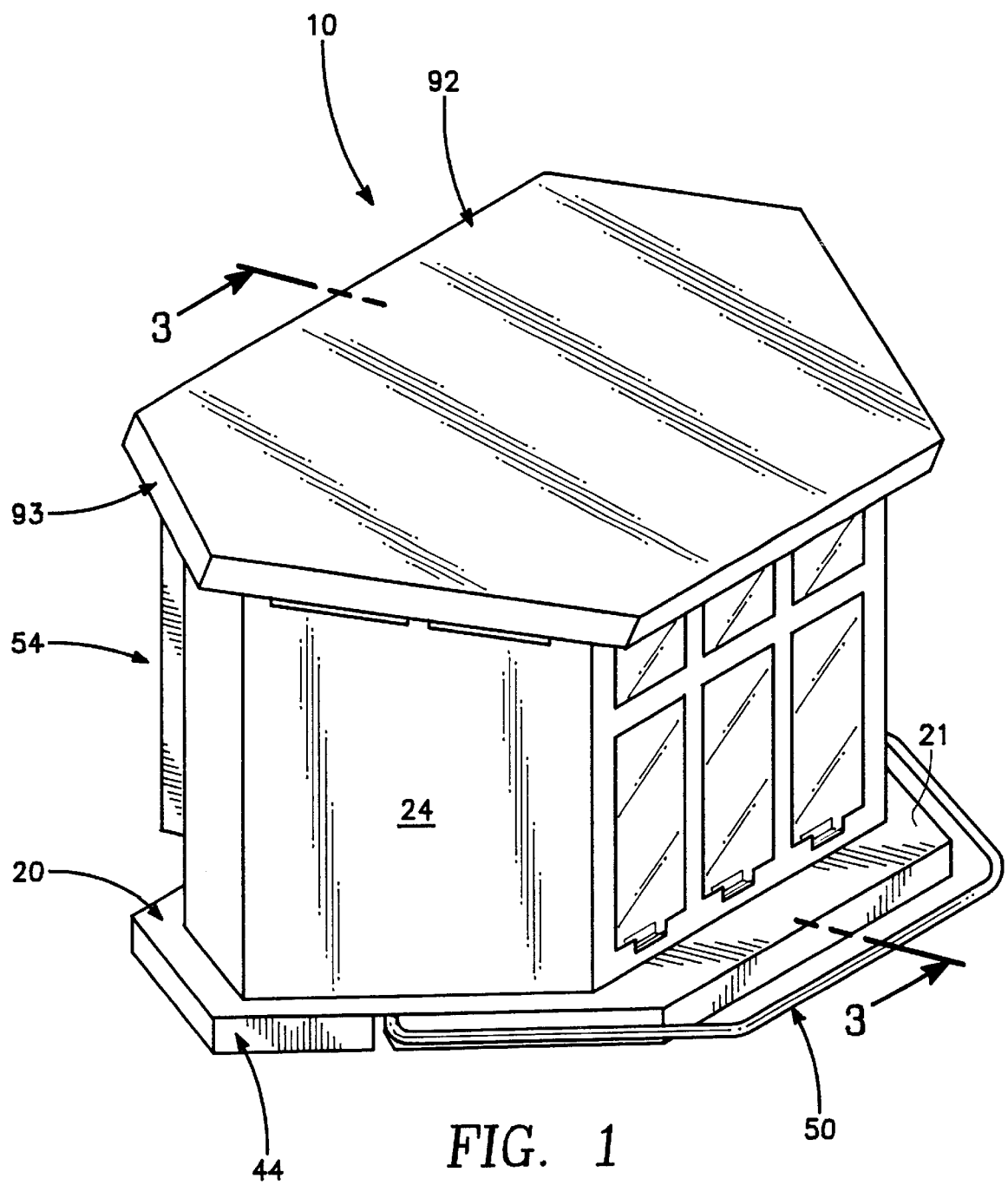
FIG. 1 is a front isometric view of the wildlife feeder of the invention.
Figure 2:
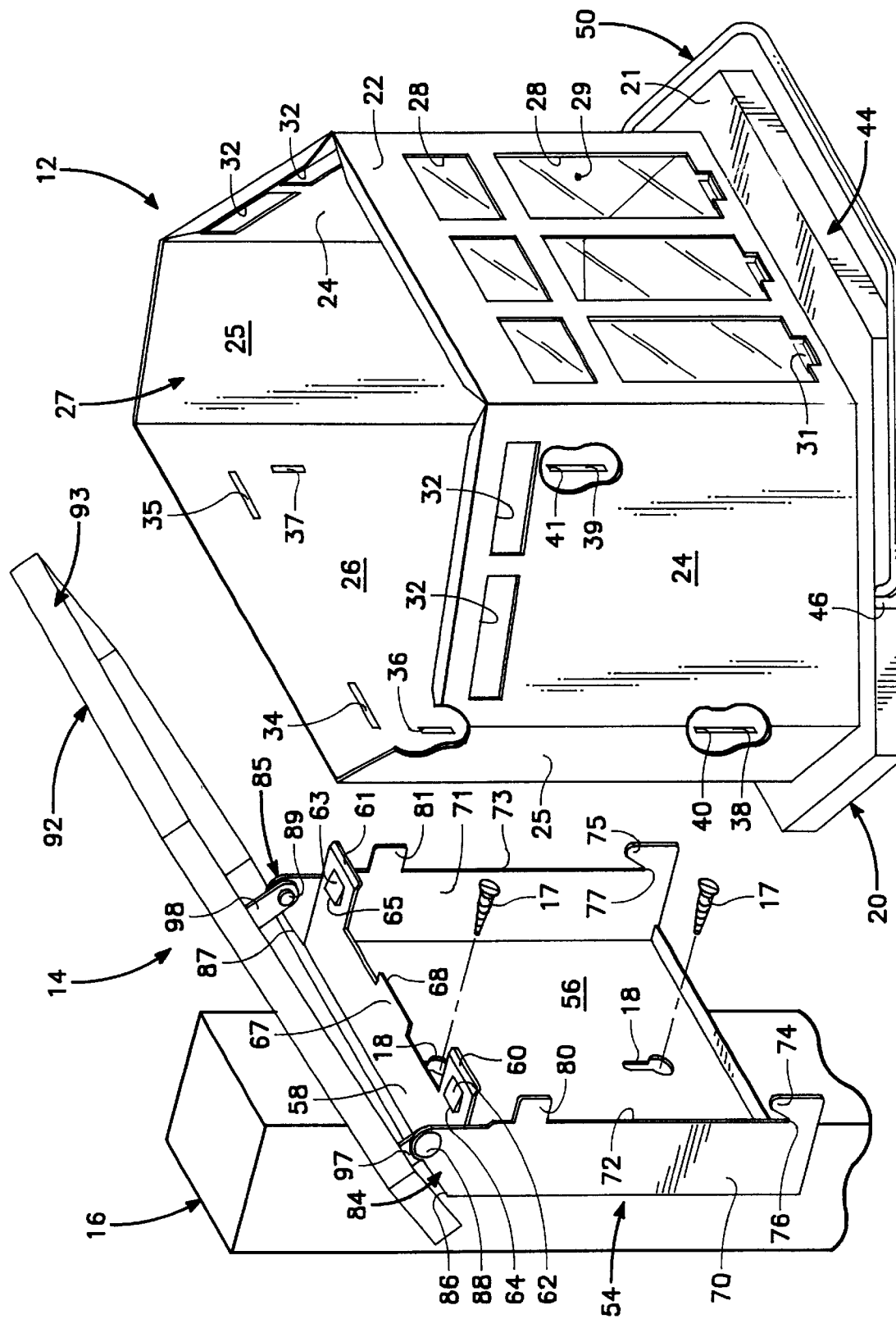
FIG. 2 is a front isometric view of the wildlife feeder of FIG. 1 showing the housing separated from the combined roof and mounting bracket.
Figure 3:
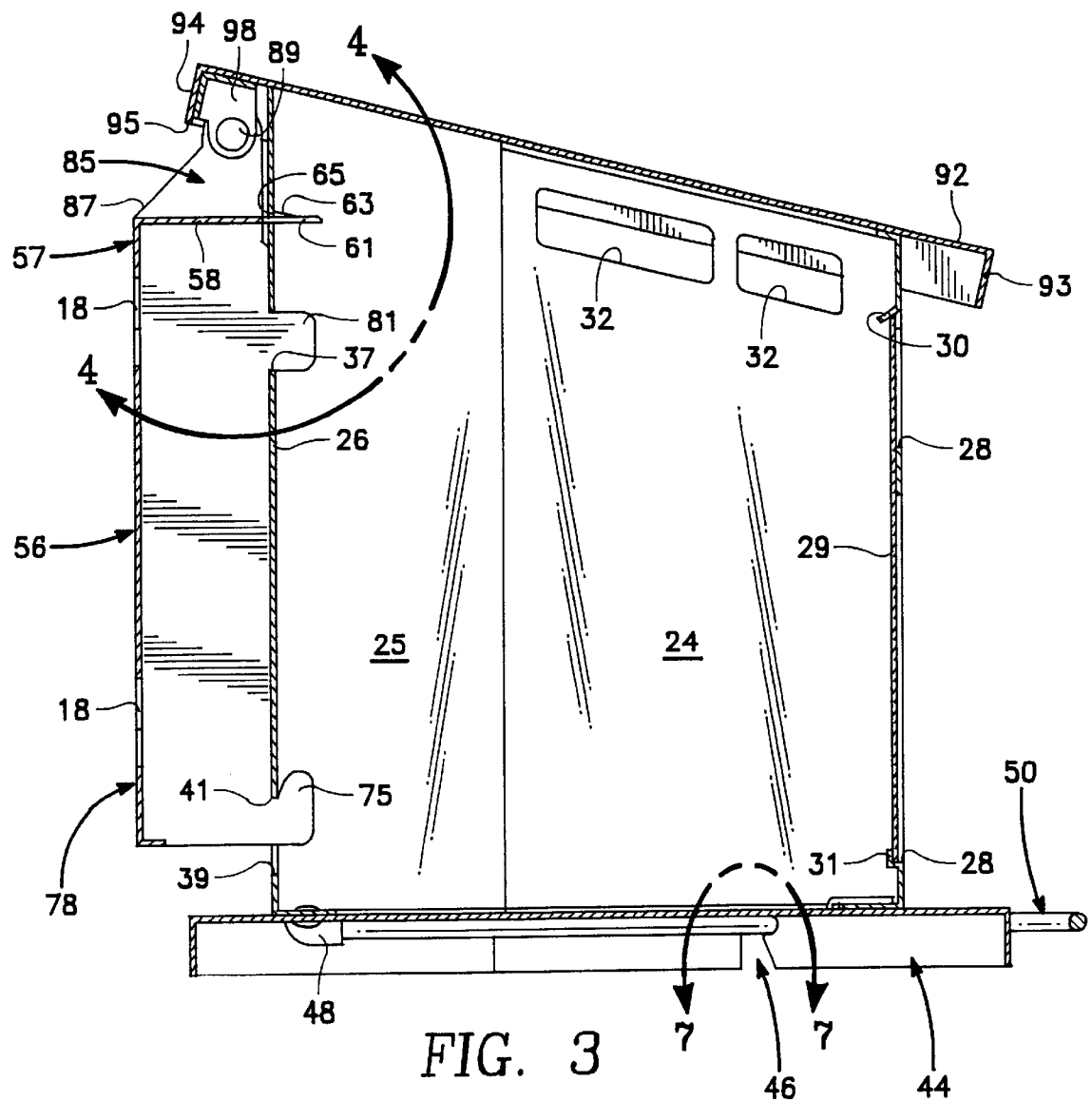
FIG. 3 is a cross-sectional view taken along lines 3—3 of FIG. 1.

With reference now to FIGS. 1 and 2, the overall wildlife feeder assembly is shown generally by reference 10. The feeder assembly comprises a housing 12 and a mounting sub-assembly 14. The sub-assembly is fixed to a support structure shown by post 16. Other support structures could be utilized, such as the side of a house, shed, garage, barn, fence, tree or pole.

The sub-assembly is secured to the support structure by any fastening means appropriate for the type of structure to which it is being secured. As shown in FIG. 2, large headed fastening screws 17, which pass through keyhole openings 18, are used to support the mounting sub-assembly. After the sub-assembly has been securely mounted to the post, the housing is releasably attached thereto in a rotational manner to be described below.

The housing comprises a base 20 from which extend upstanding enclosure walls. The base provides a bottom surface for supporting the walls and wildlife food items placed within the housing interior. As shown, the base is a flat continuous surface. However, it could be a heavy gage screen or a grated or perforated member.

The base and enclosure walls preferably have the same outline which may be round, oval or polygonal. The walls are spaced inwardly from the base outer edge to define a peripheral ledge area 21 for supporting wildlife. The outer peripheral edge of the base includes a downwardly extending skirt 44.

As shown, the enclosure walls extend upwardly from the base to define a hexagonally-shaped enclosure. Each of the walls terminate at an upper edge defining an open top 27. The enclosure comprises a front wall 22 from which extend opposing mirror image sidewalls 24, 25 and a back wall 26. The walls are interconnected and the sidewall upper edges incline downwardly from the back wall to the front wall.

Optionally, the front wall may be provided with window openings 28 which are overlaid with an interior transparent plate 29. The plate is held in place over the window openings with interior upper and lower retainer parts 30, 31. The window openings allow a user to view the contents of the housing interior and determine when to resupply the feeder with food items.

The sidewalls preferably include vent openings 32 which are located in the upper portion of forward sidewalls 24, 24. This will allow air to circulate within the housing interior and avoid mildew and related problems. The back wall is provided with multiple engagement apertures which are oriented and sized to receive corresponding engagement elements extending from the mounting subassembly.

Figure 5:
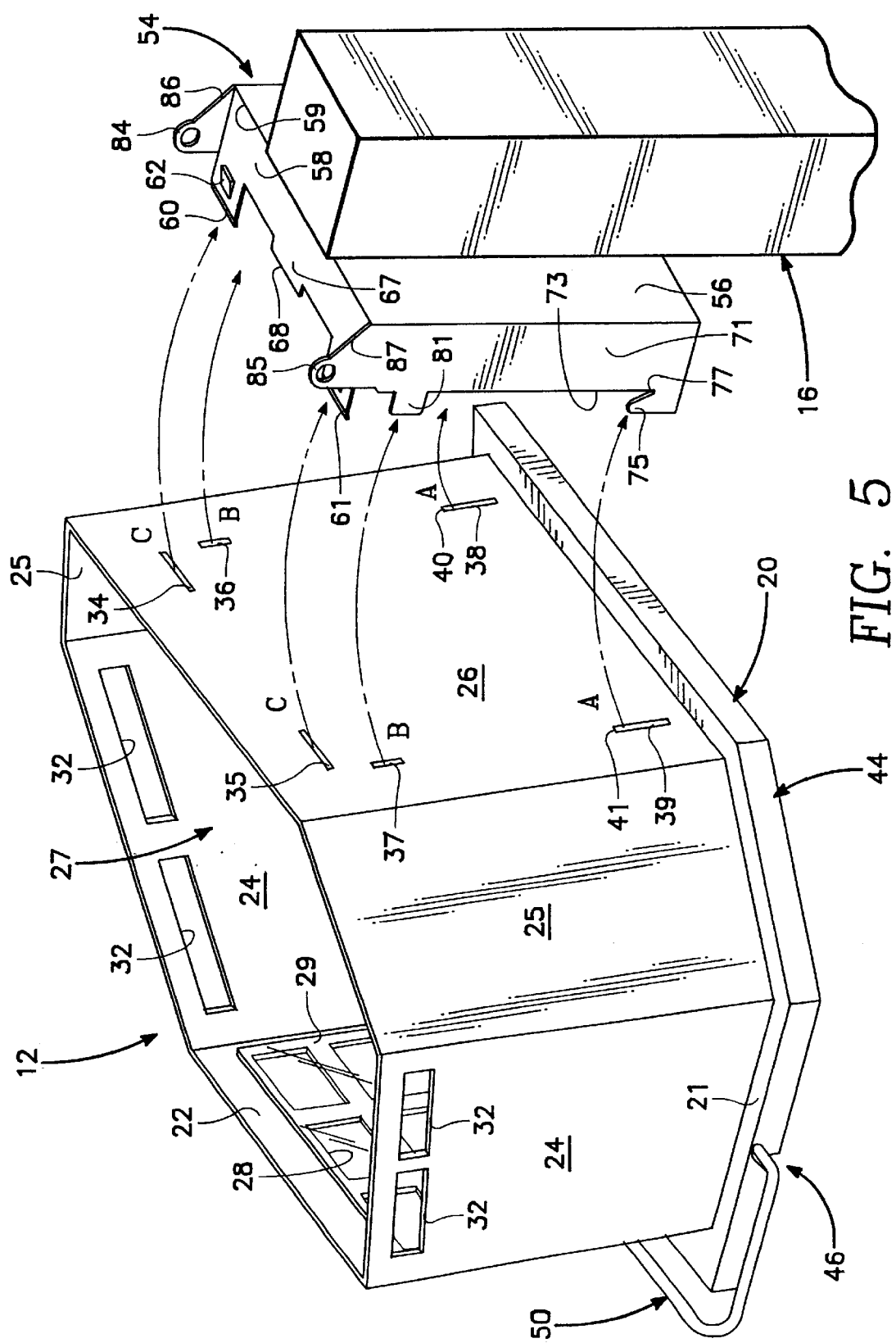
FIG. 5 is an isometric rear view of the housing being connected to the bracket with the roof removed for clarity.
Figure 6:
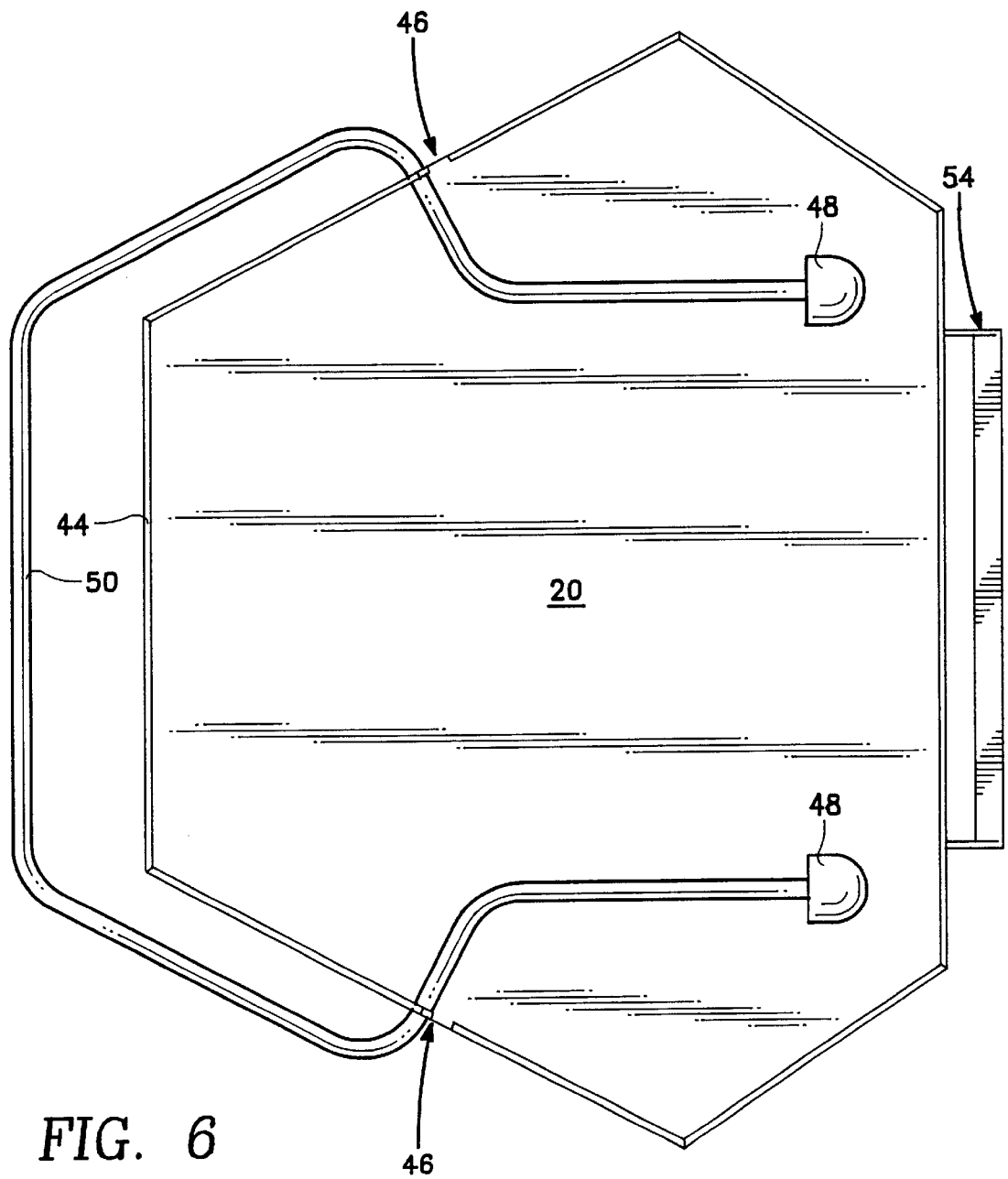
FIG. 6 is a bottom plan view of the wildlife feeder shown in FIG. 1.

As best shown in FIG. 5, the engagement apertures comprise uppermost and lowermost pairs of narrow openings. The uppermost pair are located in the upper portion of back wall 26 and comprise two spaced-apart horizontally aligned detainer slots 34, 35. The lowermost pair comprise two spaced-apart vertically aligned pivot slots 38, 39. These slots are located in the lower portion of back wall 26. Each pivot slot includes a respective upper pivot edge 40, 41 for a purpose to be hereinafter described. Between the detainer slots and pivot slots are two spaced-apart vertically aligned guide passageways 36, 37.

To facilitate use of the feeder by wildlife, base 20 is provided with a perch 50 that extends outwardly from the forward area of the feeder. As shown, the perch comprises a bilaterally symmetrical resilient wire form that has opposing free ends from which extend angular portions that merge into an outer length. The outer length has a geometrical shape similar to the forward geometrical shape of the base. The wire form angular portions pass through respective retention notches 46, 46 located at opposing sides of base skirt 44.

Figure 7:
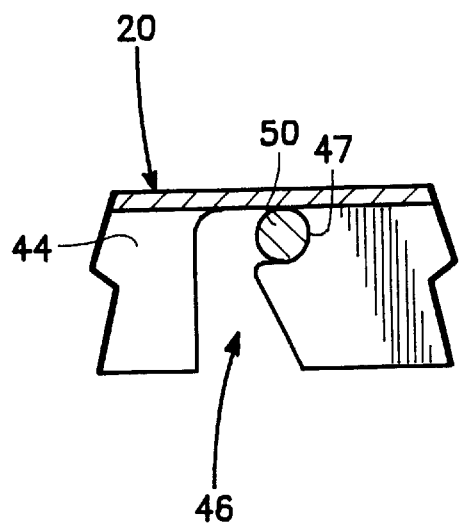
FIG. 7 is an enlarged fragmentary cross-sectional view taken along lines 7—7 of FIG. 3.

The underside of the base is provided with two spaced-apart support anchors 48. The support anchors permit insertion of the wire form free-ends and, in conjunction with the retention notches, constrain the wire form in the desired position in front of the housing. The support anchors are spaced-apart a predetermined distance on the base underside to slightly draw together the wire form free ends thereby creating an outward bias against respective undercut portions 47 of each notch, see FIG. 7. This engagement will hold the wire form in a horizontal position and prevent it from tilting downwardly when an animal rests on the forward portion of the perch.

The mounting sub-assembly basically comprises a bracket 54 to which is hingeably attached a roof 92. The bracket comprises a mounting plate 56 having an upper end portion 57 and lower end portion 78. It has opposing side edges with respective mirror-image outwardly extending side flanges 70, 71.

Each of the side flanges have a respective forward edge 72, 73 from which extend the aforementioned engagement elements. Engagement elements extending outwardly from the lower end of the side flanges comprise pivot projections 74, 75. Each projection is provided with a respective support notch 76, 77. The notches are open in an upward direction.

Extending from forward edges 72, 73 proximate the upper portion of each side flange, are stabilizer projections 80, 81. The stabilizer projections assist in imparting lateral stability to the housing connection and further provide guidance for the housing during the step of connecting the housing to the bracket in a manner to be described.

Each side flange includes an inclined top portion 84, 85 with each top portion having a respective inclined top edge 86, 87. The top edges incline downwardly at a preterminted angle from the upper-most area of each outer edge and terminate along the horizontal upper end 59 of the mounting plate.

Respective hinge pins 88, 89 extend through each respective top portion 84, 85. A hinge connection is created when a pin passes through corresponding engagement openings in spaced-apart hinged supports 97, 98. The supports extend downwardly from hinge plate 99 on the underside of the roof.

The roof has a flat shape with a periphery that is geometrically similar to, but larger than, the horizontal cross-sectional shape of the housing open top 27. When resting in a closed position upon the inclined top edges of side walls 24, 25, the roof wall will angle downwardly toward front wall 22. Extending downwardly from the roof periphery outer edge is a roof flange 93. The roof flange functions to protect the housing food contents from environmental conditions.

Figure 4:
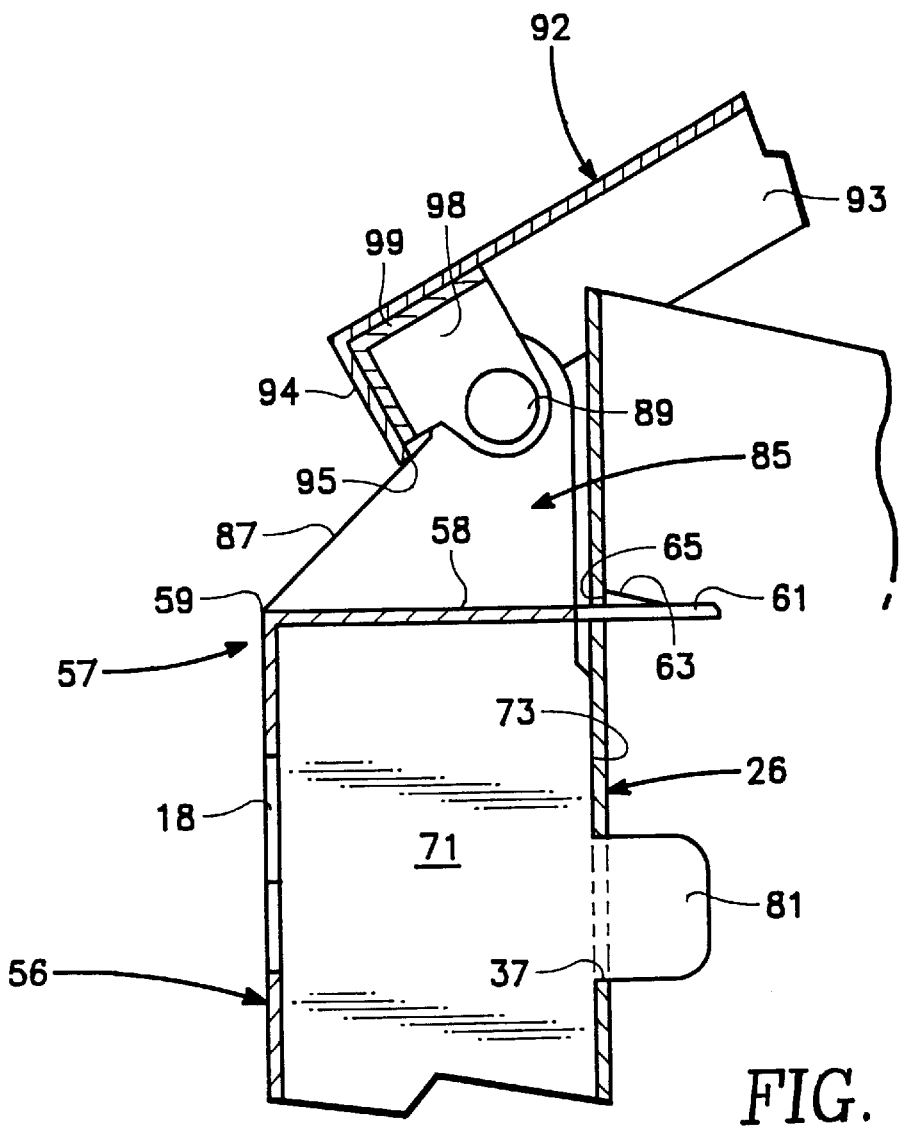
FIG. 4 is an enlarged fragmentary cross-sectional view taken along lines 4—4 of FIG. 3 with the roof in a maximum tilted-up position.

As best shown in FIGS. 2 and 4, the roof flange 93 includes a rear section 94 having a bottom edge 95. The width of the rear flange is coordinated with the angle of inclination of top edges 86, 87 so that the top edges will provide an abutment for bottom edge 95 at a maximum tilt angle of the roof. This is advantageous for limiting access to the housing interior. In the maximum tilted position as shown, gravity will always move the roof toward a closed position over open top 27. This may not be the case if the roof was tilted completely to a vertical or greater than ninety degree position. Preferably, the maximum tilt angle will be less than about forty-five degrees from horizontal.

As part of the connector means of the invention, bracket 54 includes a connector flange 58 that extends outwardly from mounting plate upper edge 59. The connector flange is located between side flanges 70, 71. It includes a midportion spacer part 67 having a forward end 68. On each side of the spacer part are opposing insert parts 60, 61. Each insert part extends outwardly about horizontally from a respective side area of the connector flange adjacent a respective side flange. The spacer part and insert parts are flat structures which are preferably integral extensions of the connector flange 58. The insert parts have a thickness and width that correspond to the dimensions of detainer slots 34, 35.

Each insert part includes a releasable retention means to prevent unwanted dislodgement from the detainer slots. Such retention means may comprise keys, plug locks, cotter pins, bolts, screws, set screws, pins, friction, adhesive, hook, clasp, clamp, clip, wire, ring, chain, padlock, wedge and magnet.

As shown, the retention means comprises deflectable retainer tabs 62, 63. Most conveniently, the tabs comprise partial cut-out portions of the insert parts. At rest, the tabs incline slightly upwardly from thee plane of the insert part and extend rearwardly to abutment ends 64, 65. The tabs are deflectable due to the inherent resilience of their material of construction, which could be metal or plastic. When the insert parts are pushed through respective detainer slots, the tabs will flex downwardly into the plane of the insert part to permit passage through the slots. Once completely through, the tabs will spring back to their at-rest position. This action will position the. abutments ends 64, 65 against the inner surface of back wall 26 and toward end 68 of spacer part 67 against the outer surface of back wall 26. The counter-acting abutments thereby prevent dislodgement of the insert parts.

Optionally, the retainer tabs could be replaced with a retainer opening (not shown) through each insert part. Once the insert parts extend through the detainer slots, any one of the aforementioned releasable retention means could be passed through the retainer opening or be lodged therein and prevent the insert parts from being withdrawn.

To operate the wildlife feeder of the present invention, a suitable support structure, such as that shown by stationary pole 16, is selected. When it is desired to use the feeder for squirrels, it is preferred that the pole have sufficient length for positioning the mounting sub-assembly 5–6 feet above ground. The sub-assembly then is placed against the post and the position of the keyholes 18, 18 are marked on the post. Thereafter, fasteners 17, 17 are screwed into the post a distance that leaves the fastener head slightly spaced outwardly from the post surface. The sub-assembly is then positioned so that the lower larger portions of the keyholes pass over the fastener heads. Once the mounting plate is passed over the screw heads, the plate (sub-assembly) is moved downwardly so that the narrow portion of the keyhole is behind the fastener head thereby preventing outward movement. At this time, the fasteners may be further screwed into the post to fix the bracket firmly to the post. The housing may now be connected to the bracket by moving it toward the plate as depicted in FIG. 5.

While the roof is being held up and the housing top portion is being tilted backwardly, the pivot slots 38, 39 removed toward respective pivot projections 74, 75 as shown by Arrows A. Once the slots pass over the projections, the housing is allowed to move down slightly whereby upper pivot edges 40, 41 will slide into notches 76, 77. In this position, the housing can then be pivoted toward a vertical position as shown by Arrows B and C. At this time, the guide passageways 36, 37 will pass over stabilizer projections 80, 81 and detainer slots 34, 35 will pass over insert parts 60, 61. Once the insert parts extend fully through the slots, forward end 68 of spacer part 67 will abut the outer surface of back wall 26. The retainer tabs will then deflect up and position abutment ends 64, 65 against the inner surface of back wall 26.

If the housing has not already been filled with a food supply, it is now ready to be filled while the roof is tilted up. Thereafter, the roof is allowed to rotate downwardly over open top 27 and the entire assembly is now ready for wildlife use.

During feeding it is expected that small animals will rest on the perch 50 and also on the exposed outer ledge 21 of base 20. In this position, the animal will be able to access food by lifting the front of the roof with their front legs or muzzle. Larger animals will be kept away from the food because of the limited tilt angle of the roof.

While the foregoing description and drawings set-forth illustrative embodiments in specific detail, it will be apparent to those skilled in the art that variations and modifications could be made without departing from the spirit and scope of the invention. Such variations and modifications which fairly come within the purview of the appended claims, are deemed to be encompassed thereby and this invention is not intended to be limited by the aforesaid specific illustrative embodiments.

We claim:

1. A wildlife feeder comprising:
   a base;
   an enclosure upstanding from said base defining an open top;
   a bracket releasably engagable to said enclosure having attachment means for securing said bracket to a support structure; said bracket comprising a mounting plate having connector means for releasably engaging said mounting plate to said enclosure wherein said connector means comprises engagement elements extending from said mounting plate, said enclosure having a back wall with engagement apertures that are coextensive with said engagement elements, said engagement apertures including detainer slots and said engagement elements including insert parts that are movable into said detainer slots, said mounting plate including a connector flange and said insert parts extending outwardly from said connector flange; and,
   a roof hingeably attached to said bracket which overlies said open top.

2. The feeder of claim 1 wherein said insert parts include deflectable retainer tabs with abutment ends that engage said back wall when said insert parts fully extend into said detainer slots.

3. The feeder of claim 2 wherein said connector flange includes a spacer part having a forward end that extends outwardly a horizontal distance that is about equal to the outward horizontal distance of said retainer tab abutment ends.

4. The feeder of claim 1 wherein said mounting plate has an upper end portion from which extends said connector flange;
   said mounting plate having a lower end portion from which extend pivot projections;
   said back wall having a bottom end portion through which extends pivot slots; and,
   said pivot projections extending into said pivot slots.

5. The feeder of claim 4 wherein said pivot slots have upper edges and said pivot projections include engagement notches which are in engagement with said upper edges.

6. The feeder of claim 1 wherein said bracket has top portions and said roof has hinge parts that connect with said top portions to permit rotation of said roof above said open top.

7. The feeder of claim 6 wherein said top portions have abutment edges and said roof has an abutment flange that contacts said abutment edges at a predetermined angular orientation of said roof above said open top.

8. The feeder of claim 1 including a wire form extending outwardly from said base.

9. The feeder of claim 8 wherein said base includes support anchors and said wire form has opposing free ends that extend into said support anchors.

10. The feeder of claim 9 wherein said base includes a peripheral skirt having retention notches through which selected portions of said wire form extend.

* * * * *